United States Patent Office 3,283,661
Patented Nov. 8, 1966

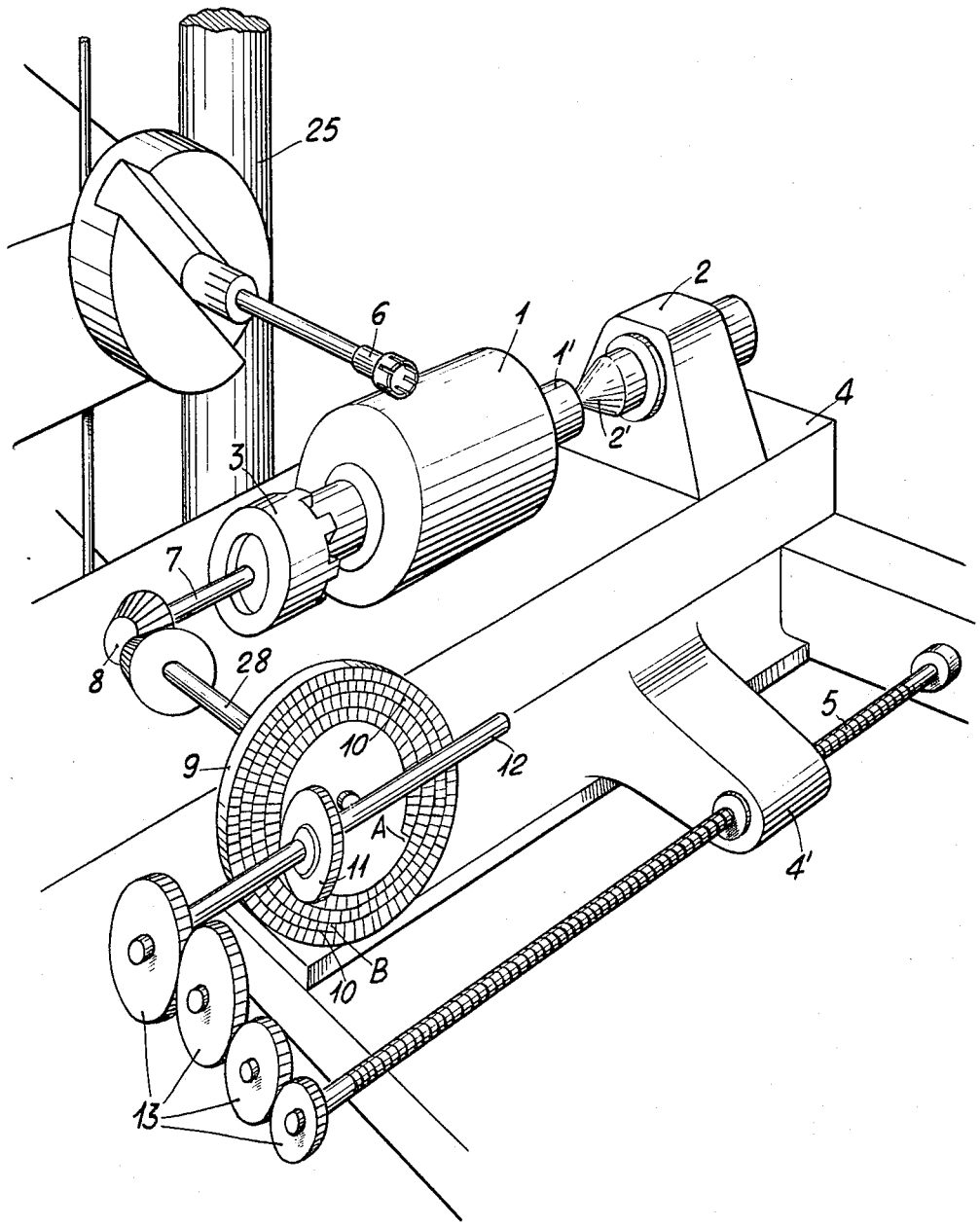

3,283,661
APPARATUS FOR MACHINING VARIABLE PITCH
HELICOID GROOVES IN ROLLING MILL ROLLS
Luigi Danieli, Buttrio, Udine, Italy
Filed July 14, 1965, Ser. No. 471,872
Claims priority, application Italy, Apr. 22, 1965,
8,814/65
3 Claims. (Cl. 90—11.5)

Hot rolling mills for producing balls directly from the bar are already known.

For a particular type of rolling mill being the subject of another patent application by the same applicant, there are employed rolls each of which is peripherically provided with a variable pitch helicoidal groove, having a semi-circular cross-section corresponding to that of the balls it is wanted to obtain.

Subject of the present invention in now an apparatus which, mounted on conventional machine tools such as milling machines, boring machines and the like, is apt to realize on a rolling mill roll of this type the helicoid groove mentioned above.

More exactly, subject of this invention is an apparatus for realizing variable pitch helicoid grooves on rolling mill rolls, characterized by the fact that it includes, in combination: a movable table of any whatever machine tool, provided with a milling cutter, on which the apparatus is mounted; two supports carried on said table and apt to support respectively by means of a spindle and a tailstock, the roll to be grooved so as to have it rotated at a variable speed under the milling cutter; a disc carrying on one face, in its central zone, a spiral rack, and peripherically a flat cylindrical gear merging with the (spiral) rack, the disc being apt to transmit to the spindle, and therefore to the roll, a variable speed revolving motion, through two shafts coupled by means of a pair of bevel gears; a sprocket wheel keyed on a splined shaft, transmitting the movement to the disc by meshing with the spiral rack and with the flat cylindrical gear; transmission and driving systems respectively apt to transmit the rotational motion to the sprocket and to generate the travelling motion of the table carrying said supports in the same direction of the axis of the roll to be worked.

The attached drawing, in its single figure, represents schematically in the way of a non limiting example a perspective view of the apparatus being the subject of the present invention, mounted on a conventional milling machine.

With reference to said figure, one can see that the apparatus being the subject of the present invention includes a movable table 4, of any whatever machine tool, for instance of the milling machine 25, on which the subject apparatus is mounted.

On said table 4 there are mounted two supports, one of which is indicated by the numeral 2, and carries the tailstock 2', while the other, for sake of simplicity, is not shown in the figure and carries the spindle 3.

Between the spindle 3 and the tailstock 2' there is mounted the rolling mill roll 1 that has to be grooved on its upper lateral surface, the spindle 3 and the tailstock clamping the axis 1' of said roll 1.

On said lateral surface of the roll 1 is apt to make engagement a milling cutter 6, carried by the milling machine 25.

The spindle 3 is driven by a shaft 7, receiving in turn its motion, through a pair of bevel gears 8 and a shaft 28, from a disc 9 fast with the shaft 28 itself. Such a disc 9 carries on one face a spiral rack 10, starting in a point A and ending in a point B, where it merges with a flat cylindrical gear 10', representing practically the closed loop extension of the rack 10.

With said rack 10 meshes the cylindrical sprocket 11, keyed on the splined shaft 12, driven by a four gear transmission 13, receiving its motion from the screw threaded shaft 5, actuating the travelling motion of the table 4. The screw threaded shaft 5 which is driven in any suitable way by the machine tool on which the apparatus subject of this invention is mounted, causes the displacement of the table 4 in the same direction of the axis of the roll to be machined 1, thanks to a lead nut provided on a bracket 4' protruding from the table 4.

As stated above, the groove on the roll 1 is machined by the milling cutter 6, driven from the above machine tool or by an independent drive.

The particular path of the variable pitch groove is obtained by means of the sprocket 11 and the rack 10–10' system as follows:

At the beginning of the cycle, the milling cutter 6, rotating at a constant speed, is positioned at the end of the roll 1 to be grooved, almost in contact with same; the disc 9, carrying the rack 10 is still, so that the initial point A of said rack 10 be on the axis of the shaft 12 which has a diametrical direction in respect to the disc 9, while the sprocket 11 is meshing in the point A.

Through rotation of the screw threaded shaft 5, there is started simultaneously the rotational movement of the roll 1 and the travelling motion of the table 4, and the milling cutter 6 begins to cut into the roll 1.

The table 4 has a constant speed travelling motion and the sprocket 11 has a constant rotational speed. The roll 1 instead has a variable rotational speed since it is driven by the disc 9, also having a variable rotational speed, and namely a decreasing speed inasmuch as it is made to rotate by the sprocket 11 through the spiral rack 10.

Beginning from point A, the sprocket 11 travels on the rack until it reaches the point B, where it switches over the flat cylindrical gear 10', continuing then to rotate peripherically on the disc 9. While the sprocket 11 meshes with the rack 10, there is thus produced on the roll 1 a variable increasing pitch groove the increments whereof, at each pitch, are proportioned to the speed increments affecting a point travelling on a rotating flat spiral having a constant pitch. Instead, as soon as the sprocket 11 meshes with the flat cylindrical gear 10', the groove machined by the milling cutter 6 on the roll 1 result with a constant pitch, since in this stage the rotational speed of the roll 1 is constant.

Other expedients besides those described above may be applied to improve the apparatus subject of the present invention, without therefore departing from the protective field of the present invention.

In particular, the apparatus may be independent, that is provided with its own drive, both for the milling cutter and for the table travelling motion, and for the rotation of the roll to be machined.

What is claimed is:

1. An apparatus for providing variable pitch helicoid grooves on rolling mill rolls, including in combination: a movable table of any whatever machine tool provided with a milling cutter, on which the apparatus is mounted; two supporting members carried on said table and apt to support respectively, by means of a spindle and a tailstock, the roll to be grooved, so that it will rotate at a variable speed under the milling cutter; a disc carrying on one face, in its central zone, a spiral rack and peripherically a flat cylindrical gear, merging with the rack, said disc being apt to transmit to the spindle, and therefore to the roll, a variable speed rotational motion through two shafts coupled through a bevel gear pair; a sprocket, keyed on a splined shaft, transmitting the movement to the disc by meshing with the rack spiral and with the flat-cylindrical gear; transmission and driving means apt to respectively transmit the rotational movement to the sprocket and to generate the travelling motion of the table carrying said supports in the same direction of the axis of the roll to be machined.

2. An apparatus for providing variable pitch helicoid grooves on rolling mill rolls, including in combination: a movable table of any whatever machine tool provided with a milling cutter, on which the apparatus is mounted; two supporting members carried on said table and apt to support respectively, by means of a spindle and a tailstock, the roll to be grooved, so that it will rotate at a variable speed under the milling cutter; a disc carrying on one face, in its central zone, a spiral rack and peripherically a flat cylindrical gear, merging with the rack, said disc being apt to transmit to the spindle, and therefore to the roll, a variable speed rotational motion through two shafts coupled through a bevel gear pair; a sprocket keyed on a splined shaft, transmitting the movement to the disc by meshing with the rack spiral and with the flat-cylindrical gear; transmission and driving means apt to respectively transmit the rotational movement to the sprocket and to generate the travelling motion of the table carrying said supports in the same direction of the axis of the roll to be machined, said transmission and driving means being constituted by a four gear transmission, the end gears whereof are respectively keyed on the end of the screw threaded shaft controlling the table travel, and on the end of the splined shaft carrying the sprocket, said four gear transmission being suitably designed for every groove section to be obtained.

3. An apparatus for providing variable pitch helicoid grooves on rolling mill rolls, including in combination: a movable table of any whatever machine tool provided with a milling cutter, on which the apparatus is mounted; two supporting members carried on said table and apt to support respectively, by means of a spindle and a tailstock, the roll to be grooved, so that it will rotate at a variable speed under the milling cutter; a disc carrying on one face, in its central zone, a spiral rack and peripherically a flat cylindrical gear, merging with the rack, said disc being apt to transmit to the spindle, and therefore to the roll, a variable speed rotational motion through two shafts coupled through a bevel gear pair; a sprocket, keyed on a splined shaft, transmitting the movement to the disc by meshing with the rack spiral and with the flat-cylindrical gear; transmission and driving means apt to respectively transmit the rotational movement to the sprocket and to generate the travelling motion of the table carrying said supports in the same direction of the axis of the roll to be machined, said transmission and driving means being constituted by a screw driven in any suitable way by the machine tool on which the apparatus is mounted, and by a lead nut with which is provided a protruding bracket of the table itself.

No references cited.

WILLIAM W. DYER, JR., *Primary Examiner.*

G. A. DOST, *Assistant Examiner.*